US010787526B2

(12) United States Patent
Hendrickson et al.

(10) Patent No.: US 10,787,526 B2
(45) Date of Patent: Sep. 29, 2020

(54) METHOD FOR STARTUP OF A GAS PHASE POLYMERIZATION REACTOR (71) Applicant: Chevron Phillips Chemical Company LP, The Woodlands, TX (US)

(72) Inventors: Greg G. Hendrickson, Kingwood, TX (US); Jeff S. Lowell, Huffman, TX (US); Eric D. Schwerdtfeger, Bartlesville, OK (US)

(73) Assignee: Chevron Phillips Chemical Company LP, The Woodlands, TX (US)

(*) Notice: Subject to any disclaimer, the term of this patent is extended or adjusted under 35 U.S.C. 154(b) by 236 days.

(21) Appl. No.: 15/946,870

(22) Filed: Apr. 6, 2018

(65) Prior Publication Data

US 2019/0309098 A1   Oct. 10, 2019

(51) Int. Cl.
*C08F 2/34* (2006.01)
*C08F 10/02* (2006.01)
*B01D 53/28* (2006.01)
*B01J 8/00* (2006.01)
*C08F 10/06* (2006.01)
*C08F 210/16* (2006.01)

(52) U.S. Cl.
CPC ............. *C08F 2/34* (2013.01); *B01D 53/28* (2013.01); *B01J 8/008* (2013.01); *C08F 10/02* (2013.01); *C08F 10/06* (2013.01); *C08F 210/16* (2013.01); *B01D 2252/10* (2013.01)

(58) Field of Classification Search
CPC ............. B01D 53/28; C08F 2/34; C08F 10/02
See application file for complete search history.

(56) References Cited

U.S. PATENT DOCUMENTS

| 4,376,191 A | 3/1983 | Geck |
| 4,564,660 A | 1/1986 | Williams et al. |
| 4,588,790 A | 5/1986 | Jenkins, III et al. |
| 5,075,395 A | 12/1991 | Durand et al. |
| 5,352,749 A | 10/1994 | DeChellis et al. |
| 5,436,304 A | 7/1995 | Griffin et al. |
| 6,107,230 A | 8/2000 | McDaniel et al. |

(Continued)

OTHER PUBLICATIONS https://link.springer.com/referenceworkentry/10.1007/978-3-662-44324-8_604 (Year: 2016).*

(Continued)

*Primary Examiner* — Vu A Nguyen
(74) *Attorney, Agent, or Firm* — Conley Rose, P.C.

(57) ABSTRACT

A gas phase polymerization process is described that includes contacting a polymer seed bed with a desiccant. The gas phase polymerization process further includes introducing a polymer seed bed into a gas phase polymerization reactor, contacting the polymer seed bed with a desiccant, and introducing a polymerization catalyst into the gas phase polymerization reactor. Also described is a gas phase polymerization process in accordance with the present disclosure that includes subjecting a polymer seed bed to startup conditions in a gas phase polymerization reactor, monitoring a moisture content of a vapor in contact with the polymer seed bed, and introducing a desiccant into the gas phase polymerization reactor to maintain the moisture content below a desired moisture content, to reduce a moisture content that is above a desired moisture content, or both.

20 Claims, 1 Drawing Sheet (56) References Cited

U.S. PATENT DOCUMENTS

| | | | |
|---|---|---|---|
| 6,189,236 B1 * | 2/2001 | Gaines | F26B 21/083 |
| | | | 34/329 |
| 6,300,271 B1 | 10/2001 | McDaniel et al. | |
| 6,355,594 B1 | 3/2002 | McDaniel et al. | |
| 6,388,017 B1 | 5/2002 | McDaniel et al. | |
| 7,163,906 B2 | 1/2007 | McDaniel et al. | |
| 7,619,047 B2 | 11/2009 | Yang et al. | |
| 7,790,820 B2 | 9/2010 | Jensen et al. | |
| 7,960,487 B2 | 6/2011 | Yang et al. | |
| 8,536,391 B2 | 9/2013 | Small et al. | |
| 2010/0331502 A1 * | 12/2010 | Hecker | C08F 10/02 |
| | | | 526/77 |

OTHER PUBLICATIONS

Haynes, Scott, et al, "Improve Fluid Bed Dryer Production Through Desiccant Technology, Part 1," Apr. 26, 2017; https://www.pharmaceuticalonline.com/doc/improve-fluid-bed-dryer-production-through-d . . . ; Pharmaceutical Online; 4 pages.

Sorbentsystems, "Desiccants: Technical Data and Terminology;" Apr. 26, 2017; https://www.sorbentsystems.com/desiccants_terminology.html; Sorbentsystems.com; 4 pages.

Sorbentsystems, "Desiccants Chart Comparisons;" Apr. 26, 2017; https://www.sorbentsystems.com/desiccants_charts.html; Sorbentsystems.com; 4 pages.

Sorbentsystems, "Desiccants Types;" Apr. 26, 2017; https://www.sorbentsystems.com/desiccants_types.html; Sorbentsystems.com; 4 pages.

* cited by examiner

METHOD FOR STARTUP OF A GAS PHASE POLYMERIZATION REACTOR

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates to the startup of a gas phase polymerization reactor; still more specifically, the present disclosure relates to contacting a polymer seed bed with a desiccant to facilitate the startup of a gas phase polymerization reactor.

BACKGROUND

Startup of a gas phase olefin polymerization reactor is typically enabled by charging a "seed bed" of polymer to the empty reactor prior to introduction of the reactants. This seed bed is likely to have been exposed to the atmosphere prior to being charged to the reactor, and thus likely contains adsorbed water even if it was purged with nitrogen or another inert gas prior to being charged to the polymerization reactor.

Water is generally a poison to polymerization catalysts and therefore its presence in the reactor system is undesirable. Additional water may be present in other areas of the polymerization reactor system, and purging of a seed bed with inert gas, such as nitrogen, and treatment of the seed bed with a scavenger, such as metal alkyls, is typically employed in an effort to remove such water. However, removal of water from the reactor system, especially gas phase polymerization reactor systems, can be challenging. Utilizing nitrogen purge to remove water from a polymerization reactor system prior to a startup can take days, with additional delays encountered as any residual water reacts with the first catalyst that is introduced into the polymerization reactor, thus killing this first catalyst and delaying the onset of polymerization. Typical scavengers (e.g., metal alkyls, such as triethyl aluminum or diethyl zinc) have a limited vapor pressure and do not easily penetrate into the polymer seed bed, nor do such scavengers circulate easily throughout the entire reactor system. Furthermore, the scavengers employed may have adverse side effects. For example, such side effects may include the formation of undesirable byproduct residue, drastic increases in polymerization catalyst activity which can lead to control difficulties, significant modification to product resin properties due to catalyst modification, and the like.

Accordingly, a need exists for methods for the removal of water from a polymer seed bed utilized during startup of a gas phase polymerization reactor.

BRIEF SUMMARY

Disclosed herein is a gas phase polymerization process comprising: contacting a polymer seed bed with a desiccant. Also disclosed herein is a gas phase polymerization process comprising: introducing a polymer seed bed into a gas phase polymerization reactor; contacting the polymer seed bed with a desiccant; and introducing a polymerization catalyst into the gas phase polymerization reactor.

Also disclosed herein is a gas phase polymerization process comprising: subjecting a polymer seed bed to startup conditions in a gas phase polymerization reactor; monitoring a moisture content of a vapor in contact with the polymer seed bed; and introducing a desiccant into the gas phase polymerization reactor to maintain the moisture content below a desired moisture content, to reduce a moisture content that is above a desired moisture content, or both.

BRIEF DESCRIPTION OF THE DRAWING

The following FIGURE illustrates an embodiment of the subject matter disclosed herein. The claimed subject matter may be understood by reference to the following description taken in conjunction with the accompanying FIGURE, in which:

While the inventions disclosed herein are susceptible to various modifications and alternative forms, only a few specific embodiments have been shown by way of example in The FIGURE, and are described in detail below. The FIGURE and the detailed descriptions of these specific aspects are not intended to limit the breadth or scope of the inventive concepts or the appended claims in any manner. Rather, The FIGURE and detailed written description are provided to illustrate the inventive concepts to a person of ordinary skill in the art and to enable such person to make and use the inventive concepts.

DETAILED DESCRIPTION

Disclosed herein is a gas phase polymerization process comprising contacting a polymer seed bed with a desiccant. As noted above, a polymer seed bed utilized during startup of a gas phase polymerization reactor during turnaround may contain water (atmospheric or otherwise) which can poison a polymerization catalyst, and contacting of the seed bed with a desiccant as per this disclosure may facilitate the removal of such water which could otherwise possibly negatively-impact the startup of the gas phase polymerization reactor.

Without wishing to be limited by theory, as water does not have to chemically react with a scavenger in order to prevent it from poisoning a polymerization catalyst and simple physical sequestration can be sufficient, contact of an activated (i.e., dry) desiccant with a polymer seed bed according to this disclosure can facilitate the removal of water. As discussed further hereinbelow, the desiccant can comprise a molecular sieve, a dehydrated silica or alumina, an activated solid super acid or "SSA," or a combination thereof. Such desiccants may be inexpensive and readily available in a wide range of average particle size. In embodiments, the particle size, shape, and/or distribution of the desiccant can be tailored in order to optimize the fluidization behavior thereof in a gas phase polymerization reactor. The chemical properties and activation (e.g., dehydration) steps of the desiccant can be optimized in order to provide efficient sequestration of water. The desiccant may be of a particle size and shape that permits feeding of the desiccant into a polymerization reactor using a catalyst feed system, which may help ensure that that the polymerization reactor system is clean and ready for use. Furthermore, in embodiments, the desiccant comprises a silica, alumina, or SSA of a particle size that enables use of (existing) catalyst activation equipment (such as an existing "dehydrator") for the "activation" step.

Figure 1:
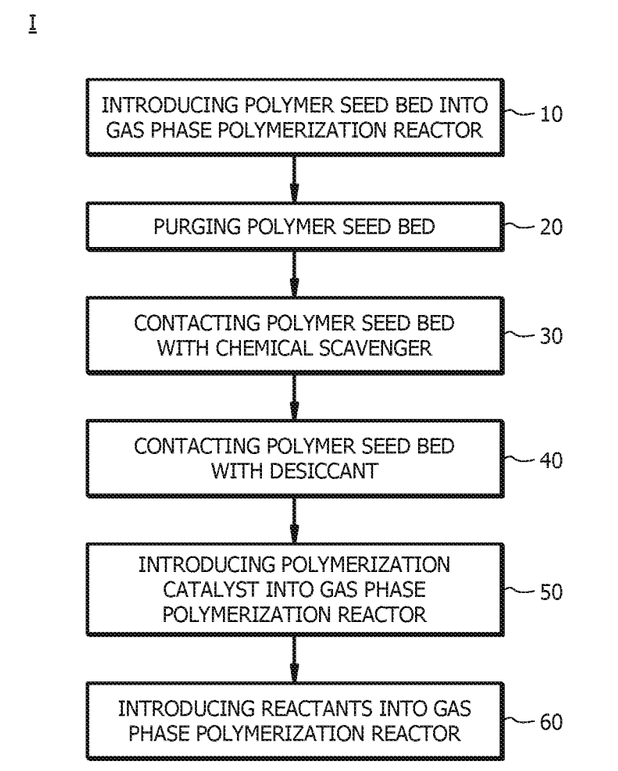
The FIGURE is a schematic depicting steps in a startup of a gas phase polymerization reactor according to an embodiment of this disclosure.

A method of this disclosure will be described with reference to The FIGURE, which is a schematic flowchart depicting steps in a startup of a gas phase polymerization reactor according to an embodiment of this disclosure. As discussed in detail hereinbelow, a gas phase polymerization process according to this disclosure comprises contacting a polymer seed bed with a desiccant 40, and can further comprise one or more of the additional steps indicated in the embodiment of The FIGURE. That is, a method of this disclosure can further comprise one or more step of introducing a polymer seed bed into a gas phase polymerization reactor 10, purging the polymer seed bed 20, contacting the polymer seed bed with a chemical scavenger 30, introducing a polymerization catalyst into a gas phase polymerization reactor 50, and introducing reactants into the gas phase polymerization reactor 60. However, the order of the additional steps relative to contacting the polymer seed bed with desiccant 40 indicated in The FIGURE can be adjusted, steps deleted or bypassed, and/or various steps can be combined, in a variety of permutations as described hereinbelow. It is to be understood that methods of startup of a gas phase polymerization reactor comprising such permutations are also within the scope of this disclosure.

A gas phase polymerization process according to this disclosure comprises contacting a polymer seed bed with a desiccant 40. The polymer seed bed comprises a solid polymer. Such polymer seed bed may be the prime (or 'on-spec') polymer product of a prior gas phase polymerization, and, as noted above, may contain some level of moisture detrimental to a gas phase polymerization catalyst. In embodiments, the polymer seed bed comprises solid polymer flake. The polymer may comprise polyethylene, polypropylene, or a combination thereof. The solid polymer flake may have an average particle size (e.g., median particle size, $d_{50}$, as measured by known particle sizing techniques such as sieving, laser diffraction, or Coulter Counters) in the range of from about 300 to 1000 microns, from about 350 to about 950 microns, from about 300 to about 750 microns, or from about 550 to about 750 microns. In embodiments, the solid polymer flake has a sphericity, as calculated using minimum fluidization velocity measurements or measured using microscopy, in the range of from about 0.5 to about 1.0, from about 0.6 to about 1.0, or from about 0.7 to about 1.0. Sphericity generally measures the degree to which a particle approaches a spherical shape, and it may be defined as the ratio between the diameter of a sphere with the same volume as the particle and the diameter of the circumscribed sphere. The sphericity of a particle is usually determined by measuring the three linear dimensions of the particle: longest diameter, intermediate diameter and shortest diameter. As the sphericity value of a particle approaches a value of 1.0, it approaches a more spherical shape.

Any suitable desiccant can be utilized. That is, any desiccant operable to adsorb moisture from the polymer seed bed, and having suitable mechanical and physical properties (e.g., suitable particle size distribution (PSD), adsorptive capacity, strength, and fluidization behavior) for use in a fluidized bed polymerization reactor can be used in accordance with this disclosure.

In non-limiting aspects, the desiccant may be molecular sieve, activated alumina, hybrid alumina-zeolite composite, silica gel, montmorillonite clay, calcium oxide, calcium sulfate, calcium chloride, activated carbon, metal salts, phosphorus-containing desiccant compounds, or combinations thereof. In select aspects, the desiccant comprises silica gel, alumina, solid super acid (SSA), molecular sieve, or a combination thereof.

In some aspects of the disclosure, the desiccant comprises a molecular sieve. The term "molecular sieve" refers to a material having a fixed, open-network structure, usually crystalline, that may be used to separate water from the polymer seed bed by selective occlusion. Molecular sieves include synthetic porous crystalline aluminosilicates that have been engineered to exhibit a strong affinity for specifically sized molecules. Molecular sieves may have no pore size distribution, as the pore size of the molecular sieve particles can be controlled during manufacturing thereof. An example of a molecular sieve suitable for use with the present disclosure is a zeolite, which has a silicate lattice, often in association with aluminum, boron, gallium, iron, and/or titanium. A non-limiting example of a suitable zeolite is a 13× molecular sieve. In accordance with one or more embodiments herein, the desiccant comprises a molecular sieve(s) having a pore size of 9 angstroms (Å) or more.

In further select aspects of the disclosure, the desiccant comprises activated alumina. An example of activated alumina is sodium treated alumina. In embodiments, the desiccant comprises an SSA, as will be described further hereinbelow with reference to the polymerization catalyst.

In additional aspects of the disclosure, the desiccant comprises silica gel. Silica gel is silicon dioxide, a naturally occurring mineral that is purified and processed into beaded or granular form. As a desiccant, silica gel may have a pore size of from about 10 Å to about 300 Å and a strong affinity for moisture. Silica gel adsorbs moisture at temperatures up to 220° F. (105° C.), with the rate of adsorption slowing down as temperatures surpass 100° F. (38° C.).

The desiccant can have a particle size distribution, an average particle size, a porosity, a pore size, a sphericity, or a combination thereof that is substantially equal to that of a polymerization catalyst utilized for the gas phase polymerization process. In embodiments, the desiccant has an average particle size, as determined, for example, by known particle sizing techniques such as sieving, laser diffraction, or Coulter Counters, in the range of from about 30 μm to about 300 μm, from about 30 μm to about 80 μm, or from about 40 μm to about 60 μm. In embodiments, the desiccant has a porosity, as determined by porosimetry, in the range of from about 20% to about 95%, from about 70% to about 92%, or from about 75% to about 91%. In embodiments, the desiccant has a sphericity, as calculated using minimum fluidization velocity measurements or measured using microscopy, in the range of from about 0.5 to about 1.0, from about 0.6 to about 1.0, or from about 0.7 to about 1.0. In embodiments, the desiccant has an adsorptive capacity for moisture at low water equilibrium partial pressure. In embodiments, at 77° F. (25° C.) and 1 mm Hg partial pressure, as determined by equilibrium measurements, the adsorptive capacity is in the range of from about 10 grams to about 30 grams water per 100 grams desiccant, from about 15 grams to about 25 grams water per 100 grams desiccant, or from about 18 grams to about 22 grams water per 100 grams desiccant. In embodiments, the desiccant can be spherical in shape, irregular in shape, or a combination thereof. Without limitation, utilization of a larger size desiccant may result in less carryover out of a polymerization reactor.

In embodiments, the polymer seed bed is fluidized prior to contacting the polymer seed bed with the desiccant, while contacting the polymer seed bed with the desiccant, subsequent to contacting the polymer seed bed with the desiccant, or a combination thereof. Fluidization may be effected with an inert gas, such as nitrogen. For example, the polymer seed bed may be fluidized by introducing nitrogen into a polymerization reactor into which the polymer seed bed was introduced. The specified superficial velocity of nitrogen in the polymerization reactor is known to those skilled in the art.

In embodiments, a moisture content of a vapor in contact with the polymer seed bed is monitored, for example, by on-line moisture analyzers such as aluminum oxide moisture probes commonly used for industrial moisture measurement. In embodiments, the vapor in contact with the polymer seed bed comprises a moisture concentration of less than 5 ppm, less than 1 ppm or less than 0.1 ppm. The polymer seed bed can be contacted with the desiccant when the moisture content of the vapor in contact with the seed bed is less than or equal to a desired moisture content.

Prior to contacting the polymer seed bed with the desiccant, the desiccant can be 'activated' or 'dehydrated' using any method known in the art. Activation and/or dehydration of the desiccant can comprise drying the desiccant. In embodiments, the desiccant is dehydrated utilizing a fluidized bed "catalyst activator," in which conventional polymerization catalyst activation may also be performed. A dehydration gas can be utilized to activate or dehydrate the desiccant. For example, a dehydration gas such as dry nitrogen can be utilized for dehydration of the desiccant when the desiccant is saturated with water (and/or other polar contaminants). Dehydration of the desiccant can be via any technique known in the art with the aid of this disclosure.

As noted in The FIGURE, the gas phase polymerization process according to the present disclosure can further comprise the step 10 of introducing the polymer seed bed into a gas phase polymerization reactor. The polymer seed bed can be contacted with the desiccant prior to introducing the polymer seed bed into the gas phase polymerization reactor (for example, in a 'precontactor'), concurrently with introducing the polymer seed bed into the gas phase polymerization reactor, subsequent to introducing the polymer seed bed into the gas phase polymerization reactor (as indicated in the embodiment of The FIGURE), or a combination thereof. Thus, contacting of the polymer seed bed with the desiccant can occur in situ within the polymerization reactor and/or ex situ in a vessel other than the polymerization reactor. For example, in embodiments, the desiccant can be charged to the gas phase polymerization reactor with the polymer seed bed, the desiccant can be fed to the polymerization reactor (for example, through a catalyst feed system) subsequent introduction of the polymer seed bed thereto, or a combination thereof.

As used herein, the terms "polymerization reactor" or "reactor" may include at least one reactor, such as a gas phase reactor, in which polymerization of olefin monomers or comonomers to produce homopolymers or copolymers can be effected. Such homopolymers and copolymers may be referred to herein as polymers, polymer product, resins, polymer fluff, or polymer flake.

The polymerization reactor is operable to produce a product polymer, or polymer 'fluff', from a feed introduced thereto via one or more polymerization feed line(s), and in the presence of a polymerization catalyst, which can be introduced via a catalyst feeder and catalyst feed line(s). The polymerization reactor may comprise any vessel or combination of vessels suitably configured to provide an environment for a chemical reaction (e.g., a contact zone) between monomers (e.g., ethylene) and/or polymers (e.g., an "active" or growing polymer chain), and optionally comonomers (e.g., butene-1, hexene-1) and/or copolymers (e.g., an "active" or growing copolymer chain), in the presence of a polymerization catalyst to yield a polymer (e.g., a polyethylene polymer) and/or copolymer. Although with reference to a single polymerization reactor, one of skill in the art viewing this disclosure will recognize that any suitable number and/or configuration of polymerization reactors may be employed.

In various embodiments, the polymerization reactor comprises a gas phase fluidized bed reactor. In embodiments, a method of this disclosure employs at least one gas phase polymerization reactor. In embodiments, the method utilizes more than one gas phase polymerization reactor. In embodiments, the method employs more than one polymerization reactor in series. In embodiments, the more than one polymerization reactor in series is operated to pass polymer continuously from one polymerization reactor to another.

The polymerization processes performed in the reactor(s) may include batch or continuous processes. Continuous processes may employ intermittent or continuous product discharge. Processes may also include partial or full direct recycle of unreacted monomer, unreacted comonomer, diluent, or a combination thereof. In embodiments, polymer is continuously withdrawn from the polymerization reactor via a polymer product line. In embodiments, polymer is continuously withdrawn from a gas phase fluidized bed polymerization reactor.

In embodiments comprising multiple reactors, production of polymerization product in multiple reactors may include several stages provided by at least two separate polymerization reactors interconnected by a transfer device making it possible to transfer the polymerization product resulting from a first polymerization reactor into a second polymerization reactor. The desired polymerization conditions in one polymerization reactor may be different from the polymerization conditions of the other polymerization reactor(s). Alternatively, polymerization in multiple reactors may include the manual transfer of polymerization product (e.g., as solid polymer) from one polymerization reactor to subsequent polymerization reactor(s) for continued polymerization. Multiple reactor systems may comprise any combination including, without limitation, multiple gas phase polymerization reactors. The multiple polymerization reactors may be operated in series, in parallel, or combinations thereof.

As illustrated in The FIGURE, the gas phase polymerization process according to this disclosure can further comprise the step 20 of purging the polymer seed bed with an inert gas. This step of purging of the polymer seed bed 20 can be performed prior to introducing the polymer seed bed into the gas phase polymerization reactor, concurrently with introducing the polymer seed bed into the gas phase polymerization reactor, subsequent to introducing the polymer seed bed into the gas phase polymerization reactor (as in the embodiment of The FIGURE), or a combination thereof. The purge gas can comprise nitrogen. Purging may be performed by contacting the polymer seed bed with nitrogen for a time determined by the measured moisture concentration in the purge gas after contacting the polymer seed bed and at a temperature not to exceed the softening temperature of the polymer seed bed. The softening temperature may be determined as the Vicat softening temperature, which is the temperature at which a specimen of the polymer seed bed is penetrated to a depth of 1 mm by a flat-ended needle with a 1 $mm^2$ circular or square cross-section. Purging the polymer seed bed 20 may be performed prior to the contacting of the polymer seed bed with the desiccant (as indicated in the embodiment of The FIGURE), concurrently with the contacting of the polymer seed bed with the desiccant, subsequent to the contacting of the polymer seed bed with the desiccant, or a combination thereof.

As noted in The FIGURE, the gas phase polymerization process according to this disclosure can further comprise the step 30 of contacting the polymer seed bed with a chemical scavenger operable to remove moisture therefrom. Suitable chemical scavengers are known in the art. In embodiments, the chemical scavenger comprises a metal alkyl, an organo-aluminum compound, an alkylaluminum compound, a dialkylzinc compound, or a combination thereof.

In embodiments, the chemical scavenger comprises an organo-aluminum compound for example, as described in U.S. Pat. No. 5,075,395, or an alkylaluminum compound, for example, as described in U.S. Pat. No. 4,564,660, the disclosure of each of which is hereby incorporated herein in its entirety for purposes not contrary to this disclosure. Specific examples of such organoaluminum or alkylaluminum compounds include, without limitation, trialkylaluminum compounds such as triethylaluminum, triisobutylaluminum, trihexylaluminum and the like, dialkylaluminum hydrides such as diethylaluminum hydride, diisobutylaluminum hydride and the like, mixtures of a trialkylaluminum and a dialkylaluminum halide such as mixture of triethylaluminum and diethylaluminum chloride, and alkylalumoxanes such as tetraethyldialumoxane, tetrabutyldialumoxane and the like. In embodiments, the organoaluminum compounds comprise trialkylaluminum compounds, mixtures of a trialkylaluminum and a dialkylaluminum halides, and alkylalumoxanes. Alternatively, the organo-aluminium compounds comprise triethylaluminum, triisobutylauminum, mixtures of triethylaluminum and diethylaluminum chloride, and tetraethyldialumoxane. In embodiments, the organo-aluminum compound comprises diethylaluminum ethoxylate, trialkylaluminum chosen from amongst triethylaluminum, triisobutyl aluminum, tri-n-hexyl aluminum, tri-n-octyl aluminum, or combinations thereof.

In embodiments, the chemical scavenger comprises a dialkylzinc compound, for example, as described in U.S. Pat. No. 4,376,191, the disclosure of which is hereby incorporated herein in its entirety for purposes not contrary to this disclosure. Such dialkylzinc compounds may be illustrated by the general formula: $ZnR_aR_b$, wherein $R_a$ and $R_b$ are alkyl radicals, which radicals may be the same or different. Generally $R_a$ and $R_b$ are alkyl radicals (which may formally be derived, for example, by removing one hydrogen atom from an alkane) containing from 1 to 12 carbon atoms, usually from 1 to 6 carbon atoms. Such alkyl radicals may be cyclic, branched or straight chain, and may be substituted with any substituent which is nonreactive with the catalyst and reactants employed in the reactor. Illustrative of such alkyl radicals are methyl, ethyl, n-propyl, isopropyl, n-butyl, tert-butyl, n-hexyl, n-octyl, n-decyl, and the like. In embodiments, the dialkylzinc compound comprises diethylzinc. When describing a group as being "derived by," "derived from," "formed by," or "formed from," such terms are used in a formal sense and are not intended to reflect any specific synthetic methods or procedure, unless specified otherwise or the context requires otherwise.

The step 30 of contacting of the polymer seed bed with the chemical scavenger can be performed prior to the step 10 of introducing the polymer seed bed into the gas phase polymerization reactor, concurrently with the step 10 of introducing the polymer seed bed into the gas phase polymerization reactor, subsequent to the step 10 of introducing the polymer seed bed into the gas phase polymerization reactor (as in the embodiment of The FIGURE), or a combination thereof. Contacting the polymer seed bed with a chemical scavenger 30 may be performed prior to the contacting of the polymer seed bed with the desiccant (as indicated in the embodiment of The FIGURE), concurrently with the contacting of the polymer seed bed with the desiccant, subsequent to the contacting of the polymer seed bed with the desiccant, or a combination thereof.

As noted in The FIGURE, the gas phase polymerization process according to this disclosure can further comprise the step 50 of introducing a polymerization catalyst into the gas phase polymerization reactor. The polymerization catalyst can be introduced (50) into the gas phase polymerization reactor prior to introducing the desiccant into the gas phase polymerization reactor, concurrently with introducing the desiccant into the gas phase polymerization reactor, subsequent to introducing the desiccant into the gas phase polymerization reactor, or a combination thereof. In embodiments, the desiccant is combined with the polymerization catalyst or a component of a polymerization catalyst system (e.g., with an SSA) or is a component of a polymerization catalyst system (e.g., is an SSA). For example, the desiccant can be combined with a polymerization catalyst or other components of a polymerization catalyst system and thereafter introduced into the polymerization reactor, in embodiments.

The process step 50 of introducing the polymerization catalyst into the gas phase polymerization reactor can be performed prior to, during, or subsequent one or more of the steps of introducing the polymer seed bed into the gas phase polymerization reactor (10), purging the polymer seed bed (20), contacting the polymer seed bed with chemical scavenger (30), and/or contacting the polymer seed bed with desiccant (40).

At least a portion of the polymerization catalyst can be introduced into the gas phase polymerization reactor with a catalyst feed system, as known in the art. In embodiments, at least a portion of the desiccant is introduced into the polymerization reactor with the same catalyst feed system, at least a portion of the desiccant is introduced into the polymerization reactor with a separate catalyst feed system, or a combination thereof.

Suitable catalyst for polymerizing the monomers and any comonomers may include, but is not limited to a catalyst(s) and, optionally, a co-catalyst(s), a promoter(s), or a combination thereof. Non-limiting examples of suitable catalyst systems include Ziegler Natta catalysts, Ziegler catalysts, chromium catalysts, chromium oxide catalysts, chromocene catalysts, single site (e.g., metallocene catalysts), nickel catalysts, and combinations thereof. Non-limiting examples of co-catalyst include triethylboron, methyl aluminoxane, alkyls such as triethylaluminum, and combinations thereof. Suitable activator-supports may comprise solid super acid (SSA) compounds. Without limitation, catalyst systems suitable for use in the polymerization reactor(s) of this disclosure have been described, for example, in U.S. Pat. Nos. 7,619,047, 7,790,820, 7,163,906, and 7,960,487, the disclosure of each of which is hereby incorporated herein by reference in its entirety for all purposes not contrary to this disclosure.

In embodiments, the polymerization catalyst comprises chromium oxide on a support selected from silica, alumina, silica-alumina, silica-titania, aluminum phosphate, or combinations thereof.

In embodiments, a method of this disclosure utilizes a catalyst system comprising at least one metallocene and at least one activator. In embodiments, the activator can be an alumoxane (for example methyl alumoxane (MAO) or a modified methyl alumoxane), a trialkylaluminum compound, an alkylaluminum hydride compound, an alkylaluminum halide compound, an organozinc compound, an organomagnesium compound, an organolithium compound, an organoboron compound, an ionizing ionic compound, a borate compound, or an aluminate compound, or any combination thereof.

An exemplary activator that may be utilized is a chemically-treated solid oxide. The term "chemically-treated solid oxide" is used interchangeably with similar terms such as, "solid oxide treated with an electron-withdrawing anion," "treated solid oxide," or "solid super acid," which is also termed "SSA." In embodiments, the polymerization catalyst system (and/or the desiccant) comprises an SSA or solid activator that derives from a solid oxide chemically-treated with an electron withdrawing anion as provided, for example, in U.S. Pat. No. 8,536,391. Alternatively or additionally, the polymerization catalyst is a metallocene catalyst having an activator support (SSA) such as those described in U.S. Pat. Nos. 6,107,230, 6,300,271, 6,355,594 and 6,388,017, the disclosure of each of which is incorporated by reference herein in its entirety.

The treated solid oxide compounds are compounds that have had their Lewis acidity increased and have electron withdrawing ability. In embodiments, the treated solid oxide compound comprises oxygen and at least one element selected from the group consisting of groups 2, 3, 4, 5, 6, 7, 8, 9, 10, 11, 12, 13, 14, and 15 of the periodic table of the elements, including the lanthanides and the actinides. In embodiments, the element is selected from the group consisting of Al, B, Be, Bi, Cd, Co, Cr, Cu, Fe, Ga, La, Mn, Mo, Ni, Sb, Si, Sn, Sr, Th, Ti, V, W, P, Y, Zn and Zr. Suitable examples of solid oxide compounds include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and mixtures thereof, such as, for example, silica-alumina and silica-zirconia. In embodiments, the solid oxide chemically-treated with an electron withdrawing anion can include, without limitation, halided, titanium-containing solid oxide, fluorided, chromium-containing solid oxide, fluorided alumina, chlorided alumina, sulfated alumina, fluorided silica-alumina, chlorided silica-alumina, fluorided silica-zirconia, or combinations thereof.

As noted in The FIGURE, a gas phase polymerization process according to this disclosure can further comprise the process step 60 of introducing reactants into a gas phase polymerization reactor, after a startup time has elapsed, under polymerization conditions to produce a polymer product. Gas phase polymerization may be effected as known in the art, and/or as described further hereinbelow. The reactants may be substantially continuously introduced. The startup time is indicated as the time between introducing the polymerization catalyst into the gas phase polymerization reactor and a time at which a temperature of a fluidizing gas at an inlet of the gas phase polymerization reactor is decreased to less than a temperature of the polymer seed bed in order to maintain a constant seed bed temperature (i.e., when polymerization is considered initiated). In embodiments, the startup time is at least 15%, 20%, 30%, 40%, or 50% less than the startup time of a same gas phase polymerization process absent the desiccant. In embodiments, the time period between starting polymerization catalyst feed (i.e., continuously introducing polymerization catalyst into the gas phase polymerization reactor) and the time when the polymerization reaction has been initiated can be up greater than, less than, or equal to about 5, 10, 15, 20, or 24 hours when moisture scavengers as described herein are not utilized.

As noted above, a gas phase polymerization process according to this disclosure comprises contacting a polymer seed bed with a desiccant 40, and can further comprise one or more additional steps. By way of example, a method of this disclosure can comprise one or more of additional steps 10, 20, 30, 50, and 60, indicated in the embodiment of The FIGURE. The additional steps can be combined with each other or with the step of contacting of the polymer seed bed with the desiccant (step 40), absent (i.e., in select aspects, no purging of the polymer seed bed and/or contacting of the polymer seed bed with the chemical scavenger may be employed), or in another order (as detailed hereinabove) from that indicated in The FIGURE.

By way of example, in embodiments, a gas phase polymerization process comprises steps of introducing a polymer seed bed into a gas phase polymerization reactor (step 10), contacting the polymer seed bed with a desiccant (step 40), and introducing a polymerization catalyst into the gas phase polymerization reactor (step 50). In embodiments, a moisture content within the gas phase polymerization reactor may be monitored, and the polymerization catalyst introduced into the gas phase polymerization reactor when the moisture content is at or below a desired moisture content. This desired moisture content may be about 5 ppm moisture, about 4 ppm moisture, about 3 ppm moisture, about 2 ppm moisture, or about 1 ppm moisture, in select embodiments. In embodiments, the polymer seed bed may be purged with an inert gas prior to introducing the polymer seed bed into the gas phase polymerization reactor, concurrently with introducing the polymer seed bed into the gas phase polymerization reactor, subsequent to introducing the polymer seed bed into the gas phase polymerization reactor, or a combination thereof. For example, in embodiments the polymer seed bed is introduced into a gas phase polymerization reactor 10 and purged with an inert gas 20 prior to contact of the polymer seed bed with the desiccant 40.

Alternatively or additionally, a chemical scavenger may be introduced into the gas phase polymerization reactor prior to introducing the polymer seed bed into the gas phase polymerization reactor, concurrently with introducing the polymer seed bed into the gas phase polymerization reactor, subsequent to introducing the polymer seed bed into the gas phase polymerization reactor, or a combination thereof. For example, in aspects of the present disclosure, the polymer seed bed is introduced into a gas phase polymerization reactor (step 10), purged with an inert gas (step 20), and contacted with a chemical scavenger (step 30) prior to (during and/or subsequent) contact of the polymer seed bed with the desiccant (step 40). In other embodiments, the purge step 20 is absent. In embodiments, purging with the polymer seed bed with inert gas 20 and/or contacting of the polymer seed bed with a chemical scavenger 30 are utilized to reduce the moisture level to a desired level prior to (during and/or subsequent) contacting of the polymer seed bed with desiccant 40. This desired level may be about 5 ppm moisture, about 4 ppm moisture, about 3 ppm moisture, about 2 ppm moisture, or about 1 ppm moisture, in embodiments. For example, purging and/or contacting with chemical scavenger may be utilized to bring the moisture level of a vapor above the polymer seed bed within the gas phase polymerization reactor to less than or equal to a desired amount prior to contacting of the polymer seed bed with the desiccant, in embodiments.

In embodiments, purging with the polymer seed bed with inert gas 20, contacting of the polymer seed bed with a chemical scavenger 30, and/or contacting of the polymer seed bed with the desiccant 40 are utilized to reduce the moisture level to a desired level prior to (during and/or subsequent) introducing the polymerization catalyst into the gas phase polymerization reactor 40. For example, purging 10, contacting with chemical scavenger 30, and/or contacting with the desiccant 40 may be utilized to bring the moisture level of a vapor above the polymer seed bed within the gas phase polymerization reactor to less than or equal to a desired amount prior to introducing polymerization catalyst into the gas phase polymerization reactor 50. This desired amount may be about 5 ppm moisture, about 4 ppm moisture, about 3 ppm moisture, about 2 ppm moisture, or about 1 ppm moisture, in embodiments. In embodiments, an amount of desiccant is added in anticipation of an amount of moisture that will be released (e.g., formed and/or eluted) from the polymerization catalyst and/or the polymer seed bed following contacting of the polymer seed bed with the polymerization catalyst.

In aspects of the disclosure, purging the polymer seed bed with inert gas 20, contacting of the polymer seed bed with a chemical scavenger 30, contacting of the polymer seed bed with the desiccant 40, and introducing the polymerization catalyst into the gas phase polymerization reactor 50 are carried out until polymerization is initiated, at which time reactants are continuously introduced into the gas phase polymerization reactor 60. For example, some combination of purging the polymer seed bed 10, contacting the polymer seed bed with chemical scavenger 30, contacting the polymer seed bed with the desiccant 40, and introducing polymerization catalyst into the gas phase polymerization reactor 50 may be utilized to bring the moisture level of a vapor above the polymer seed bed within the gas phase polymerization reactor to less than or equal to a desired amount and/or to initiate polymerization prior to continuously introducing reactants into the gas phase polymerization reactor 60. This desired amount may be about 5 ppm moisture, about 4 ppm moisture, about 3 ppm moisture, about 2 ppm moisture, or about 1 ppm moisture, in embodiments.

The desiccant will not produce polymer, and thus the initial polymer production may have artificially high residual inert component levels or "ash" levels. The ash particles can have a particle size distribution close to that of the starting desiccant material, and can be larger than typical ash particles, resulting in "gritty" polymer that can be handled the same as conventional "off-spec" startup material. In embodiments, utilization of a desiccant as per this disclosure results in about the same or fewer bed turnovers prior to the extraction of prime polymer product (i.e., desired polymer product) from a gas phase polymerization reactor, relative to a same startup absent the desiccant. In embodiments, an amount of polymerization catalyst introduced into a gas phase polymerization reactor prior to steady state polymerization that produces prime polymer product is reduced relative to the same process absent contacting of the polymer seed bed with a desiccant as per this disclosure. In embodiments, an amount of polymerization catalyst introduced into a gas phase polymerization reactor prior to steady state polymerization that produces prime polymer product is reduced by 10%, 20%, 30%, 40%, 50%, or 60% relative to the same process absent contacting of the polymer seed bed with a desiccant as per this disclosure.

Once polymerization has been initiated (as indicated by a higher temperature of the polymer seed bed within the gas phase polymerization reactor than a temperature of a fluidizing gas being introduced thereto), reactants can be continuously introduced into the gas phase polymerization reactor, and gas phase polymerization carried out as known in the art or described hereinbelow.

In embodiments, a gas phase polymerization process according to this disclosure comprises subjecting a polymer seed bed to startup conditions in a gas phase polymerization reactor; monitoring a moisture content of a vapor in contact with the polymer seed bed; and introducing a desiccant into the gas phase polymerization reactor to maintain the moisture content below a desired moisture content, to reduce a moisture content that is above a desired moisture content, or both. For example, a polymer seed bed may be introduced into a gas phase polymerization reactor, purged with an inert gas and/or contacted with a chemical scavenger to provide a desired moisture level prior to introduction of a polymerization catalyst into the gas phase polymerization reactor. Prior to, during, and/or subsequent the introduction of the polymerization catalyst, should the moisture level in the vapor phase above the polymer seed bed rise above a desired level, a desiccant can be introduced to reduce the moisture to a desired level.

Such startup conditions may comprise a pressure range from about 100 psig to about 500 psig (from about 0.7 MPa to about 3.5 MPa), about 200 psig to about 400 psig (from about 1.4 MPa to about 2.8 MPa), or from about 250 psig to about 350 psig (from about 1.7 MPa to about 2.4 MPa). Monomer, diluent, any comonomer, various additives, or a combination thereof, may be present in the gas phase polymerization reactor in concentrations representative of the polymer grade to be manufactured. The seed bed temperature is maintained at a value representative of the polymer grade to be manufactured.

Operating conditions for the gas phase polymerization in the gas phase polymerization reactor (i.e., conditions for use when introducing reactants into the gas phase polymerization reactor 60) may include a pressure in the range of from about 100 psig to about 500 psig (from about 0.7 MPa to about 3.5 MPa), about 200 psig to about 400 psig (from about 1.4 MPa to about 2.8 MPa), or from about 250 psig to about 350 psig (from about 1.7 MPa to about 2.4 MPa).

Monomer, diluent, catalyst, any comonomer, various additives, or a combination thereof, which may be fed to the gas phase polymerization reactor (e.g., via one or more polymerization feed line(s)), may circulate through the reactor as polymerization occurs. Generally, continuous processes may comprise the continuous introduction of a monomer, an optional comonomer, a catalyst, a diluent, etc., into the polymerization reactor, and the continuous removal (e.g., via a polymer product line) of a polymer product (which may be, for example, a gaseous phase) comprising solid polymer (e.g., polyethylene).

In embodiments, the monomer comprises an α-olefin, such as, without limitation, ethylene (ethene) or propylene (propene). In embodiments, a comonomer comprises an unsaturated hydrocarbon having 3 to 12 carbon atoms. For example, a comonomer may comprise propene, butene-1, hexene-1, octene-1, or combinations thereof.

In embodiments having multiple polymerization reactors, various types of reactors that may additionally be included in a reactor system of this disclosure may comprise slurry reactors, gas-phase reactors, tubular reactors, or high pressure reactors, as well as combinations thereof. Gas-phase reactors may comprise fluidized bed reactors or staged horizontal reactors. Gas-phase reactors may employ a continuous recycle stream containing one or more monomers continuously cycled through a fluidized bed in the presence of the catalyst under polymerization conditions. A recycle stream may be withdrawn from the fluidized bed and recycled back into the polymerization reactor. Simultaneously, polymer product may be withdrawn from the polymerization reactor and new or fresh monomer may be added to replace the polymerized monomer. Likewise, copolymer product may optionally be withdrawn from the reactor and new or fresh comonomer may be added to replace polymerized comonomer, polymerized monomer, or combinations thereof. Such gas phase polymerization reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. Such gas phase reactor may be as disclosed in U.S. Pat. Nos. 5,352,749, 4,588,790 or 5,436,304, the disclosure of each of which is hereby incorporated herein by reference in its entirety for all purposes not contrary to this disclosure.

Conditions of a polymerization reactor, e.g., polymerization reactor, which may be chosen and even controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs free energy equation. Typically this includes from about 60° C. to about 280° C., for example, or from about 70° C. to about 110° C., depending upon the type of polymerization reactor.

In an embodiment, the gas phase polymerization may occur in an environment having a suitable combination of temperature and pressure. For example, polymerization may occur at a pressure in the range of from about 100 psig to about 500 psig (from about 0.7 MPa to about 3.5 MPa), about 200 psig to about 400 psig (from about 1.4 MPa to about 2.8 MPa), or from about 250 psig to about 350 psig (from about 1.7 MPa to about 2.4 MPa); and a temperature in a range of from about 150° F. to about 230° F. (from about 65° C. to about 110° C.), or from about 176° F. to about 220° F. (from about 80° C. to about 104° C.).

The concentration of various reactants can be controlled to produce solid polymer with certain physical and mechanical properties. The proposed end-use product that will be formed by the solid polymer and the method of forming that product determines the desired properties. Mechanical properties include tensile, flexural, impact, creep, stress relaxation and hardness tests. Physical properties include density, molecular weight, molecular weight distribution, melting temperature, glass transition temperature, temperature melt of crystallization, density, stereoregularity, crack growth, long chain branching and rheological measurements.

The concentrations, partial pressures, or both of the monomer, comonomer, hydrogen, co-catalyst, modifiers, and electron donors are important in producing these resin properties. Comonomer may be used to control product density. Hydrogen may be used to control product molecular weight. Co-catalysts can be used to alkylate, scavenge poisons and control molecular weight. Activator-support can be used to activate and support the catalyst. Modifiers can be used to control product properties and electron donors affect stereoregularity, the molecular weight distribution, or molecular weight. In addition, the concentration of poisons may be minimized because poisons impact the reactions and product properties.

Thus, polymerization reaction components of the polymerization reactor(s) disclosed herein (e.g., the gas phase polymerization reactor) may include olefin monomers (e.g., ethylene) and comonomers (e.g., hexene), diluent (e.g., isobutane, hexane, pentane, propane, or combinations thereof), molecular weight control agents (e.g., hydrogen), and any other desired co-reactants or additives. Polymerization reaction components may additionally include a catalyst, and optionally, a co-catalyst. Suitable catalyst for polymerizing the monomers and any comonomers may include, but is not limited to a catalyst(s) and, optionally, a co-catalyst(s), a promoter(s), or a combination thereof, as described hereinabove.

In an embodiment, the polymerization reactor product comprises polyolefins, which may be homopolymers or copolymers. In embodiments, the polymerization reactor product comprises polyethylene, polypropylene, polybutadiene, polybutene, polymethylpentene, or a combination thereof. In embodiments, the reactor product comprises copolymers of ethylene with propylene, butene-1, hexene-1, octene-1, or a combination thereof.

In embodiments, the polymerization product comprises a mixture of the solid polymer and a vapor phase. The mixture may comprise unreacted, gaseous monomers or optional comonomers (e.g., unreacted ethylene monomers, unreacted comonomers), gaseous waste products, gaseous contaminants, or combinations thereof. As used herein, an "unreacted monomer," for example, ethylene, refers to a monomer that was introduced into a polymerization reactor during a polymerization reaction but was not incorporated into a polymer. As used herein, an "unreacted comonomer," for example, butene-1, refers to a comonomer that was introduced into a polymerization reactor during a polymerization reaction but was not incorporated into a polymer. Such gaseous phase product mixtures may be present when gas phase polymerization reactor(s) are utilized.

In embodiments, the solid polymer may comprise a homopolymer, a copolymer, or combinations thereof. The homopolymer, the polymers of the copolymer, or both may comprise a multimodal (e.g., a bimodal) polymer (e.g., polyethylene). For example, the solid polymer may comprise both a relatively high molecular weight, low density (HMWLD) polyethylene polymer component and a relatively low molecular weight, high density (LMWHD) polyethylene polymer component. Various types of suitable polymers may be characterized as having a various densities. For example, a Type I may be characterized as having a density in a range of from about 0.910 g/cm$^3$ to about 0.925 g/cm$^3$, alternatively, a Type II may be characterized as having a density from about 0.926 g/cm$^3$ to about 0.940 g/cm$^3$, alternatively, a Type III may be characterized as having a density from about 0.941 g/cm$^3$ to about 0.959 g/cm$^3$, alternatively, a Type IV may be characterized as having a density of greater than about 0.960 g/cm$^3$. The solid polymer may comprise other polyolefin polymers. In embodiments, the polymer product produced via the gas phase polymerization is a low density polymer, a Type I polymer, a Type II polymer, a Type III polymer, a Type IV polymer, or a combination thereof. Details of the specifics of these different types of polymers can be found, for example, in ASTM D 883-07.

The herein disclosed utilization of desiccant(s) in a process for gas phase polymerization startup may provide economic benefit, as a desiccant as disclosed herein may be of a lower cost than conventionally employed metal alkyls, and the use of a desiccant as per this disclosure may reduce or eliminate the use of metal alkyl or another chemical scavenger. Additionally, the desiccant employed as per this disclosure can be safer to handle than metal alkyls. Utilization of a desiccant acting in the same reactor space as the polymerization catalyst can, in embodiments, ensure that the catalyst experiences an anhydrous environment. In embodiments, existing equipment may be utilized to activate or dehydrate the desiccant and/or introduce same into a gas phase polymerization reactor. The herein-disclosed method may reduce or eliminate time spent purging the reactor system prior to full scale polymerization, which may result in lower cost, a higher on-stream factor, and/or lower environmental impact. Depending on the particle size of desiccant utilized, the process of this disclosure can, in embodiments, reduce fines carryover and help minimize or prevent reactor sheeting, especially when compared to the conventional use of activated catalyst to dry a polymer seed bed.

ADDITIONAL DISCLOSURE

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents, the definitions that are consistent with this specification should be adopted.

The following are nonlimiting, specific embodiments in accordance with the present disclosure:

A: A gas phase polymerization process comprising: contacting a polymer seed bed with a desiccant.

B: A gas phase polymerization process comprising: introducing a polymer seed bed into a gas phase polymerization reactor; contacting the polymer seed bed with a desiccant; and introducing a polymerization catalyst into the gas phase polymerization reactor.

C: A gas phase polymerization process comprising: subjecting a polymer seed bed to startup conditions in a gas phase polymerization reactor; monitoring a moisture content of a vapor in contact with the polymer seed bed; and introducing a desiccant into the gas phase polymerization reactor to maintain the moisture content below a desired moisture content, to reduce a moisture content that is above a desired moisture content, or both.

Each of embodiments A, B, and C may have one or more of the following additional elements. Element 1: further comprising purging the polymer seed bed, contacting the polymer seed bed with a chemical scavenger, or both. Element 2: wherein the chemical scavenger comprises a metal alkyl. Element 3: wherein the purging of the polymer seed bed, the contacting of the polymer seed bed with the chemical scavenger, or both are performed prior to the contacting of the polymer seed bed with the desiccant, concurrently with the contacting of the polymer seed bed with the desiccant, subsequent to the contacting of the polymer seed bed with the desiccant, or a combination thereof. Element 4: further comprising monitoring a moisture content of a vapor in contact with the polymer seed bed. Element 5: further comprising contacting the polymer seed bed with the desiccant when the moisture content is greater than or equal to a desired moisture content. Element 6: wherein the desired moisture content comprises about 5, 4, 3, 2, or 1 ppm moisture. Element 7: wherein the purging of the polymer seed bed, the contacting of the polymer seed bed with the chemical scavenger, or both are performed prior to introducing the polymer seed bed into a gas phase polymerization reactor, concurrently with introducing the polymer seed bed into a gas phase polymerization reactor, subsequent to introducing the polymer seed bed into a gas phase polymerization reactor, or a combination thereof. Element 8: wherein the polymer seed bed is contacted with the desiccant prior to introducing the polymer seed bed into a gas phase polymerization reactor, concurrently with introducing the polymer seed bed into a gas phase polymerization reactor, subsequent to introducing the polymer seed bed into a gas phase polymerization reactor, or a combination thereof. Element 9: further comprising introducing a polymerization catalyst into the gas phase polymerization reactor. Element 10: wherein the polymerization catalyst is introduced into the gas phase polymerization reactor prior to introducing the desiccant into the gas phase polymerization reactor, concurrently with introducing the desiccant into the gas phase polymerization reactor, subsequent to introducing the desiccant into the gas phase polymerization reactor, or a combination thereof. Element 11: further comprising combining the desiccant with the polymerization catalyst. Element 12: wherein at least a portion of the polymerization catalyst is introduced into the gas phase polymerization reactor with a catalyst feed system, and wherein at least a portion of the desiccant is introduced into the polymerization reactor with the same catalyst feed system, at least a portion of the desiccant is introduced into the polymerization reactor with a separate catalyst feed system, or a combination thereof. Element 13: wherein the polymerization catalyst system comprises a Ziegler-based polymerization catalyst system, a chromium-based polymerization catalyst system, a single-site-based polymerization catalyst system, or a combination thereof. Element 14: wherein the polymerization catalyst comprises chromium oxide on a support selected from silica, alumina, silica-alumina, silica-titania, aluminum phosphate, or combinations thereof. Element 15: further comprising, after a startup time has elapsed, continuously introducing reactants into the gas phase polymerization reactor under polymerization conditions to produce a polymer product, wherein the startup time is indicated as the time between introducing the polymerization catalyst into the gas phase polymerization reactor and a time at which a temperature of a fluidizing gas at an inlet of the gas phase polymerization reactor is less than a temperature of the polymer seed bed. Element 16: wherein the reactants comprise ethylene and optionally other olefins and wherein the polymer product comprises polyethylene (PE). Element 17: wherein the startup time is at least 15, 20, 30, 40, or 50% less than a corresponding time of a same gas phase polymerization process absent the desiccant. Element 18: wherein the desiccant comprises silica gel, alumina, solid super acid, molecular sieve, or a combination thereof. Element 19: wherein the desiccant has a particle size distribution (PSD), an average particle size, a porosity, a sphericity, or a combination thereof that is substantially equal to that of a polymerization catalyst utilized for the gas phase polymerization process. Element 20: wherein the desiccant has an average particle size in the range of from about 30 µm to about 300 µm, from about 30 µm to about 80 µm, or from about 40 µm to about 60 µm, a porosity in the range of from about 20% to about 95%, from about 70% to about 92%, or from about 75% to about 91%, a sphericity in the range of from about 0.5 to about 1.0, from about 0.6 to about 1.0, or from about 0.7 to about 1.0, or a combination thereof. Element 21: wherein the polymer seed bed comprises solid polyethylene polymer flake having an average particle size ($d_{50}$) in the range of from about 550 microns to 750 microns, a sphericity in the range of from about 0.7 to 1.0, or both. Element 22: further comprising fluidizing the polymer seed bed prior to contacting the polymer seed bed with the desiccant, while contacting the polymer seed bed with the desiccant, subsequent to contacting the polymer seed bed with the desiccant, or a combination thereof. Element 23: further comprising monitoring a moisture content within the gas phase polymerization reactor and introducing the polymerization catalyst into the gas phase polymerization reactor when the moisture content is at or below a desired moisture content. Element 24: further comprising purging the polymer seed bed with an inert gas prior to introducing the polymer seed bed into the gas phase polymerization reactor, concurrently with introducing the polymer seed bed into the gas phase polymerization reactor, subsequent to introducing the polymer seed bed into the gas phase polymerization reactor, or a combination thereof. Element 25: further comprising introducing a chemical scavenger into the gas phase polymerization reactor. Element 26: further comprising monitoring a moisture content of the gas phase polymerization reactor, and introducing the polymerization catalyst into the gas phase polymerization reactor subsequent to the introduction of the chemical scavenger thereto and when the moisture content is less than or equal to a desired moisture content. Element 27: wherein the desired moisture content comprises about 5, 4, 3, 2, or 1 ppm moisture. Element 28: wherein the polymer seed bed is contacted with the desiccant prior to introduction of the polymer seed bed into the gas phase polymerization reactor, concurrently with the introduction of the polymer seed bed into the gas phase polymerization reactor, subsequent to the introduction of the polymer seed bed into the gas phase polymerization reactor, or a combination thereof.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference, to the extent that they provide exemplary, procedural or other details supplementary to those set forth herein.

What is claimed is:

1. A gas phase polymerization process comprising:
   contacting a polymer seed bed with a desiccant, wherein the desiccant comprises silica gel, alumina, solid super acid, molecular sieve, or a combination thereof, and wherein the desiccant has a particle size distribution (PSD), an average particle size, a porosity, a sphericity, or a combination thereof that is substantially equal to that of a polymerization catalyst used in the gas phase polymerization process.

2. The gas phase polymerization process of claim 1, further comprising purging the polymer seed bed, contacting the polymer seed bed with a chemical scavenger, or both.

3. The gas phase polymerization process of claim 2, wherein the purging of the polymer seed bed, the contacting of the polymer seed bed with the chemical scavenger, or both are performed prior to the contacting of the polymer seed bed with the desiccant, concurrently with the contacting of the polymer seed bed with the desiccant, subsequent to the contacting of the polymer seed bed with the desiccant, or a combination thereof.

4. The gas phase polymerization process of claim 3 further comprising monitoring a moisture content of a vapor in contact with the polymer seed bed, and contacting the polymer seed bed with the desiccant when the moisture content is greater than or equal to a desired moisture content.

5. The gas phase polymerization process of claim 2, wherein the purging of the polymer seed bed, the contacting of the polymer seed bed with the chemical scavenger, or both are performed prior to introducing the polymer seed bed into a gas phase polymerization reactor, concurrently with introducing the polymer seed bed into a gas phase polymerization reactor, subsequent to introducing the polymer seed bed into a gas phase polymerization reactor, or a combination thereof.

6. The gas phase polymerization process of claim 1, wherein the polymer seed bed is contacted with the desiccant prior to introducing the polymer seed bed into a gas phase polymerization reactor, concurrently with introducing the polymer seed bed into a gas phase polymerization reactor, subsequent to introducing the polymer seed bed into a gas phase polymerization reactor, or a combination thereof.

7. The gas phase polymerization process of claim 6 further comprising introducing a polymerization catalyst into the gas phase polymerization reactor, wherein the polymerization catalyst is introduced into the gas phase polymerization reactor prior to introducing the desiccant into the gas phase polymerization reactor, concurrently with introducing the desiccant into the gas phase polymerization reactor, subsequent to introducing the desiccant into the gas phase polymerization reactor, or a combination thereof.

8. The gas phase polymerization process of claim 7 further comprising, after a startup time has elapsed, continuously introducing reactants into the gas phase polymerization reactor under polymerization conditions to produce a polymer product, wherein the startup time is indicated as the time between introducing the polymerization catalyst into the gas phase polymerization reactor and a time at which a temperature of a fluidizing gas at an inlet of the gas phase polymerization reactor is less than a temperature of the polymer seed bed.

9. The gas phase polymerization process of claim 1, wherein the desiccant has an average particle size in the range of from about 30 µm to about 300 µm, a porosity in the range of from about 20% to about 95%, a sphericity in the range of from about 0.5 to about 1.0, or a combination thereof.

10. A gas phase polymerization process comprising:
introducing a polymer seed bed into a gas phase polymerization reactor;
contacting the polymer seed bed with a desiccant, wherein the desiccant comprises silica gel, alumina, solid super acid, molecular sieve, or a combination thereof, and wherein the desiccant has a particle size distribution (PSD), an average particle size, a porosity, a sphericity, or a combination thereof that is substantially equal to that of the polymerization catalyst; and
introducing a polymerization catalyst into the gas phase polymerization reactor.

11. The gas phase polymerization process of claim 10 further comprising monitoring a moisture content within the gas phase polymerization reactor and introducing the polymerization catalyst into the gas phase polymerization reactor when the moisture content is at or below a desired moisture content.

12. The gas phase polymerization process of claim 10 further comprising purging the polymer seed bed with an inert gas prior to introducing the polymer seed bed into the gas phase polymerization reactor, concurrently with introducing the polymer seed bed into the gas phase polymerization reactor, subsequent to introducing the polymer seed bed into the gas phase polymerization reactor, or a combination thereof.

13. The gas phase polymerization process of claim 10 further comprising introducing a chemical scavenger into the gas phase polymerization reactor.

14. The gas phase polymerization process of claim 13 further comprising monitoring a moisture content of the gas phase polymerization reactor, and introducing the polymerization catalyst into the gas phase polymerization reactor subsequent to the introduction of the chemical scavenger thereto and when the moisture content is less than or equal to a desired moisture content.

15. The gas phase polymerization process of claim 10, wherein the polymer seed bed is contacted with the desiccant prior to introduction of the polymer seed bed into the gas phase polymerization reactor, concurrently with the introduction of the polymer seed bed into the gas phase polymerization reactor, subsequent to the introduction of the polymer seed bed into the gas phase polymerization reactor, or a combination thereof;
wherein the polymerization catalyst is introduced into the gas phase polymerization reactor prior to introducing the desiccant into the gas phase polymerization reactor, concurrently with introducing the desiccant into the gas phase polymerization reactor, subsequent to introducing the desiccant into the gas phase polymerization reactor, or a combination thereof;
or a combination thereof.

16. The gas phase polymerization process of claim 10 further comprising continuously introducing reactants into the gas phase polymerization reactor under polymerization conditions to produce a polymer product, wherein the reactants comprise ethylene and optionally other olefins and wherein the polymer product comprises polyethylene (PE).

17. A gas phase polymerization process comprising:
subjecting a polymer seed bed to startup conditions in a gas phase polymerization reactor;
monitoring a moisture content of a vapor in contact with the polymer seed bed; and
introducing a desiccant into the gas phase polymerization reactor to maintain the moisture content below a desired moisture content, to reduce a moisture content that is above a desired moisture content, or both,
wherein the desiccant comprises silica gel, alumina, solid super acid, molecular sieve, or a combination thereof, and wherein the desiccant has a particle size distribution (PSD), an average particle size, a porosity, a sphericity, or a combination thereof that is substantially equal to that of a polymerization catalyst used in the gas phase polymerization process.

18. The gas phase polymerization process of claim 10, wherein the desiccant has an average particle size in the range of from about 30 µm to about 300 µm.

19. The gas phase polymerization process of claim 10, wherein the desiccant has a porosity in the range of from about 20% to about 95%.

20. The gas phase polymerization process of claim 10, wherein the desiccant has a sphericity in the range of from about 0.5 to about 1.0.

* * * * *